United States Patent
Park et al.

(10) Patent No.: US 7,502,092 B2
(45) Date of Patent: *Mar. 10, 2009

(54) LIQUID CRYSTAL DISPLAY AND DRIVING METHOD THEREOF

(75) Inventors: Jin-Woo Park, Suwon-si (KR); Tae-Soo Kim, Suwon-si (KR); Tae-Hyeog Jung, Suwon-si (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 405 days.

This patent is subject to a terminal disclaimer.

(21) Appl. No.: 11/136,857

(22) Filed: May 24, 2005

(65) Prior Publication Data

US 2005/0285994 A1 Dec. 29, 2005

(30) Foreign Application Priority Data

Jun. 29, 2004 (KR) .................. 10-2004-0049304

(51) Int. Cl.
*G02F 1/1333* (2006.01)
(52) U.S. Cl. ....................... 349/161; 349/72
(58) Field of Classification Search ............... 349/72, 349/161; 345/101
See application file for complete search history.

(56) References Cited

U.S. PATENT DOCUMENTS

| 4,460,247 | A | 7/1984 | Hilsum et al. |
| 6,535,266 | B1 | 3/2003 | Nemeth et al. |
| 6,573,882 | B1* | 6/2003 | Takabayashi ............ 345/102 |
| 2004/0036834 | A1* | 2/2004 | Ohnishi et al. ............ 349/177 |
| 2004/0164946 | A1* | 8/2004 | Cavanaugh et al. ........ 345/101 |

FOREIGN PATENT DOCUMENTS

| CN | 1246633 | 3/2000 |
| JP | 64-037536 | 2/1989 |
| JP | 8-211368 | 8/1996 |
| JP | 9-96796 | 4/1997 |
| JP | 2000-194313 | 7/2000 |
| JP | 2003-131191 | 5/2003 |

OTHER PUBLICATIONS

Patent Abstracts of Japan for Publication No. 2000-194313; Date of publication of application Jul. 14, 2000, in the name of Hanetaki Katsuhiro et al.
Patent Abstracts of Japan for Publication No. 2000-131191; Date of publication of application May 8, 2003, in the name of Yamakita Hirofumi et al.
Patent Abstracts of Japan, Publication No. 08-211368, dated Aug. 20, 1996, in the name of Masanaru Abe.
Patent Abstracts of Japan, Publication No. 09-096796, dated Apr. 8, 1997, in the name of Minoru Kanbara.

* cited by examiner

*Primary Examiner*—Michael H Caley
(74) *Attorney, Agent, or Firm*—Christie, Parker & Hale, LLp

(57) ABSTRACT

A liquid crystal display (LCD) includes a panel including a first substrate on which a black matrix, a conductive layer, an insulation layer, and a common electrode are formed, a second substrate formed opposite to the first substrate and coupled to the first substrate by a sealant, and a liquid crystal between the first and second substrates. A temperature sensor senses a temperature of the panel and/or an environment surrounding the panel. A power supply controls the temperature of the panel by heating the conductive layer in response to the temperature sensed by the temperature sensor.

15 Claims, 5 Drawing Sheets

LIQUID CRYSTAL DISPLAY AND DRIVING METHOD THEREOF

CROSS REFERENCE TO RELATED APPLICATION

This application claims priority to and the benefit of Korean Patent Application No. 10-2004-0049304 filed on Jun. 29, 2004 in the Korean Intellectual Property Office, the entire content of which is incorporated herein by reference.

BACKGROUND OF THE INVENTION

1. Field of the Invention

The present invention relates to a liquid crystal display (LCD) and a driving method thereof, and more particularly, it relates to an LCD designed to stably operate at a low temperature and a driving method thereof.

2. Description of the Related Art

In recent years, personal computers and televisions have been designed to be light-weight and flat, and consequentially display devices are being designed to be thinner and more light-weight. Thus, flat panel displays including liquid crystal displays (LCDs) have been developed as an alternative to traditional cathode ray tubes (CRT).

An LCD display utilizes two substrates and a liquid crystal material with an anisotropic dielectric constant solution injected therebetween. An electric field is applied to the liquid crystal material. The amount of light transmitted through the substrates from an external light source is controlled by the intensity of the electric field to obtain a desired image signal.

Such an LCD is the most common type of flat panel display. A thin film transistor-LCD (TFT-LCD) using a TFT as a switch is a common embodiment of such an LCD.

In the TFT-LCD, electrodes (pixel electrodes and a common electrode) are arranged opposite to each other with a liquid crystal between the opposite electrodes thereby defining pixels. Accordingly, each pixel of the TFT-LCD can be modeled as a liquid crystal capacitor. FIG. 1 is an equivalent pixel circuit illustrating such a pixel in the LCD.

As shown in FIG. 1, each pixel of the LCD includes a TFT 10 having a source electrode and a gate electrode respectively coupled to a data line Dm and a scan line Sn, a liquid crystal capacitor Cl coupled between a drain electrode and a common voltage Vcom of the TFT 10, and a storage capacitor Cst coupled to the drain electrode of the TFT 10.

The TFT 10 applies a data voltage Vd to a pixel voltage Vp through a data line Dm to each pixel (not shown) in response to a scan signal applied through the scan line Sn. An electric field corresponding to a difference between the pixel voltage Vp and a common voltage Vcom applied to a common electrode (not shown) is applied to a liquid crystal (equivalently shown as a liquid crystal capacitor in FIG. 1). The liquid crystal in turn controls light transmittance corresponding to the intensity of the electric field. Accordingly, the storage capacitor Cst maintains the pixel voltage applied to the liquid crystal Cl until the next data voltage Vd is applied so as to allow light to transmit through the liquid crystal.

In general, methods for driving an LCD can be classified into a color filter method and a field sequential method.

An LCD employing the color filter method forms a color filter layer having three primary colors (red, green, and blue) on an upper substrate of a panel, and adjusts the amount of light transmitted through the color filter layer to express a desired color. The LCD employing the color filter method adjusts the amount of light transmitted through color filters of red, green, and blue from a single light source and combines the red, green, and blue lights to display a desired color.

Because such an LCD displays colors using a single light source and three color filter layers, it thus requires more than triple the number of pixels needed to display a monochrome image, which pixels respectively correspond to red, green, and blue color areas. Accordingly, sophisticated manufacturing technology is required to produce a color device which provides a high resolution image. Moreover, the red, green, and blue color filters are separately formed on the upper substrate of the liquid crystal display which further complicates the manufacturing process of the liquid crystal display; light transmittance of the color filters must be considered as well.

On the other hand, an LCD employing the field sequential driving method periodically and sequentially turns on and off independent red, green, and blue light sources, and synchronously applies a corresponding pixel voltage Vp to each pixel in accordance with the periodic switching to thereby obtain a color image. In other words, the field sequential driving method uses persistence of vision, i.e., the after image effect on the eye, to display a colored image by way of outputting the red, green, and blue lights from RGB light sources (backlights), and time-divides the red, green, and blue lights to sequentially display the time-divided red, green, and blue lights as a pixel instead of dividing the pixel into three separate red, green, and blue colored pixels.

Accordingly, an LCD using the field sequential method drives one frame by dividing it into R, G, and B fields, and so the response speed of the liquid crystal must be faster than that of an LCD using the color filter method. However, a liquid crystal in a portable device such as a cellular phone may be frequently exposed to low temperatures which slow the device's response speed. Because the response speed of a liquid crystal slows down at low temperatures, color reproducibility is degraded when the field sequential method is employed.

SUMMARY OF THE INVENTION

Accordingly, in one embodiment of the present invention a liquid crystal display (LCD) and driving method are provided for stably operating the LCD in low temperature.

In an exemplary embodiment of the present invention, a liquid crystal display (LCD) includes a panel, a temperature sensor, and a power supply. The panel includes a first substrate on which a black matrix, a conductive layer, an insulation layer, and a common electrode are formed, a second substrate formed opposite to the first substrate and coupled to the first substrate by a sealant, and a liquid crystal disposed between the first and second substrates. The temperature sensor senses a temperature of the panel and/or an environment surrounding the panel. The power supply controls the temperature of the panel by heating the conductive layer in response to the temperature sensed by the temperature sensor.

In an alternative embodiment, the conductive layer is formed from a transparent material.

In another alternative embodiment, the conductive layer is formed of indium tin oxide (ITO), tin oxide (TO), or indium zinc oxide (IZO).

In another embodiment, the power supply supplies a heating voltage to the conductive layer when the temperature sensed by the temperature sensor is lower than a reference temperature.

In yet another embodiment, the sealant is a conductive sealant, and the power supply supplies a heating voltage to the sealant coupled to the conductive layer when the temperature sensed by the temperature sensor is lower than the reference temperature.

In yet another embodiment, the sealant is a conductive sealant coupled to the conductive layer on the first substrate, and the LCD further includes an auxiliary electrode formed between the sealant and the second substrate, and the power supply supplies a heating voltage to the auxiliary electrode when the temperature sensed by the temperature sensor is lower than a reference temperature.

In yet another embodiment, the reference temperature is between 10° C. and 25° C.

In yet another embodiment, the LCD further includes a light source for sequentially outputting red, green, and blue lights to each of a plurality of pixels, and a light source controller for controlling the light source.

In yet another embodiment, the temperature sensor produces a plurality of control signals corresponding to a plurality of temperature levels, the plurality of temperature levels being selected from a temperature range below a predetermined temperature.

In yet another embodiment, the power supply supplies a different heating voltage corresponding to each of the temperature levels.

In yet another embodiment, the power supply supplies a higher heating voltage at a lower temperature level, and a lower heating voltage at a higher temperature level.

In yet another embodiment of the present invention, a method of driving an LCD including a panel having a first substrate on which a black matrix, a conductive layer, an insulation layer, and a common layer are formed, a second substrate formed opposite to the first substrate and assembled with the first substrate using a sealant, and a liquid crystal disposed between the first and second substrates, is provided. The driving method further includes sensing a temperature of the panel and/or an environment surrounding the panel, and heating the conductive layer when the temperature of the panel is lower than a reference temperature.

In an alternative embodiment, a heating voltage is applied to the conductive layer to heat the conductive layer.

In another alternative embodiment, the heating voltage is directly applied to the conductive layer from an external source.

In another embodiment, the sealant is a conductive sealant, and the heating voltage is applied to the conductive layer by being externally applied to the sealant coupled to the conductive layer.

In another embodiment, the sealant is a conductive sealant coupled to the conductive layer formed on the upper layer, and the heating voltage is applied to the conductive layer by being externally applied an auxiliary electrode formed between the sealant and the second substrate.

In another embodiment, heating the conductive layer comprises determining, from among a plurality of temperature levels, a temperature level corresponding to the sensed temperature to produce a determined temperature, and applying a heating voltage corresponding to the determined temperature level to the conductive layer.

In another embodiment, the heating voltage is set to be higher at a lower temperature level, and wherein the heating voltage is set to be lower at a higher temperature level.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
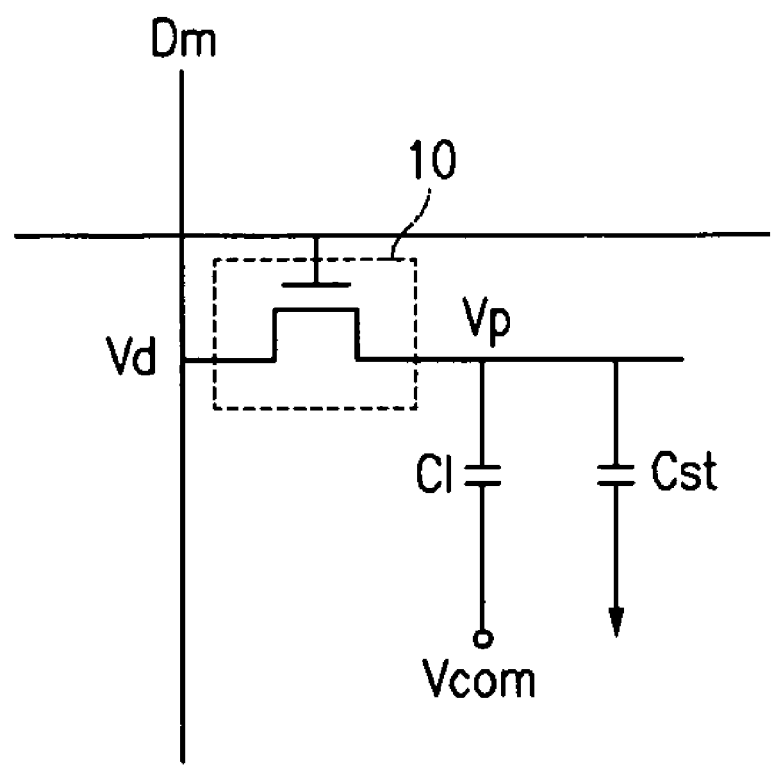
FIG. 1 illustrates a pixel circuit of a conventional LCD.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive. There may be parts shown in the drawings, or parts not shown in the drawings, that are not discussed in the specification as they are not essential to a complete understanding of the invention. Further, like reference numerals designate like elements.

Figure 2:
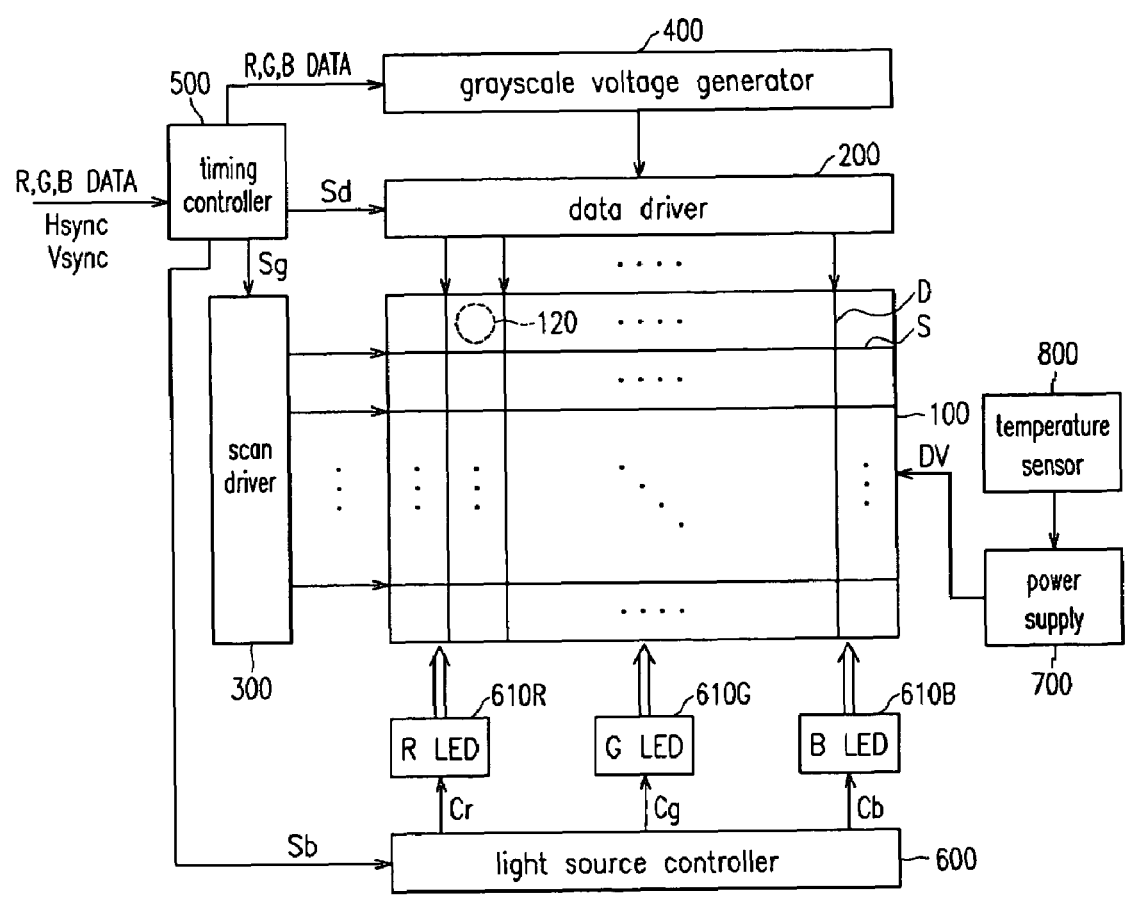
FIG. 2 illustrates an LCD according to an embodiment of the present invention.

FIG. 2 illustrates a liquid crystal display (LCD) according to an embodiment of the present invention.

Referring to FIG. 2, the LCD includes a panel 100; a scan driver 300; a data driver 200; a grayscale voltage generator 400; a timing controller 500; light emitting diodes (LEDs) 610R, 610G, and 610B respectively outputting red, green, and blue lights; a light source controller 600; a temperature sensor 800; and a power supply 700.

The panel 100 includes a plurality of pixels 120 arranged in a matrix format in an area where scan lines S and data lines D cross each other.

The timing controller 500 receives grayscale data signals R, G, and B DATA, a horizontal synchronization signal Hsync, and a vertical synchronization signal Vsync from an external device or a graphics controller (not shown), and outputs a scan control signal Sg to control the scan driver 300, a data control signal Sd to control the data driver 200, and a light source control signal Sb to control the light source controller 600. The timing controller 500 supplies the grayscale data signals R, G, and B DATA to the grayscale voltage generator 400.

The scan driver 300 sequentially applies a scan signal to the scan line S in response to the scan control signal Sg applied from the timing controller 500, and selects a horizontal line to which a data voltage Vd is applied.

The grayscale voltage generator 400 generates a grayscale voltage (herein, referred to as data voltage Vd) corresponding to the grayscale data signals R, G, and B DATA, and applies the data voltage Vd to the data driver 200. The data driver 200 is controlled by the data control signal Sd, and applies the data voltage Vd to the data line D.

The light source controller 600 controls the LEDs 610R, 610G, and 610B to respectively emit light for different periods within one frame in response to the light source control signal Sb. According to the embodiment of the present invention, the LED is used as a backlight, but in other embodiments it is not restricted thereto.

The temperature sensor 800 senses the temperature of the panel 100 and/or an environment surrounding the panel, generates a control signal, and supplies the control signal to the power supply 700 when the sensed temperature is lower than a reference temperature (i.e., ordinary temperature). In an exemplary embodiment of the present invention, the reference temperature is set to be between 10° C. to 25° C.

The power supply 700 applies a direct current (DC) voltage DV to the panel 100 when the control signal is supplied from the temperature sensor 800 so as to prevent the temperature of the panel 100 from becoming lower than the reference temperature. In one embodiment, once the temperature of the panel 100 is sensed to be lower than the reference temperature, the panel 100 is heated. Accordingly, the temperature of the panel 100 is maintained at higher than the predetermined temperature regardless of variation of the ambient temperature, and the response speed of the liquid crystal in the panel 100 is maintained at a predetermined speed, thereby guaranteeing accuracy and color reproducibility of the LCD.

Figure 3A:
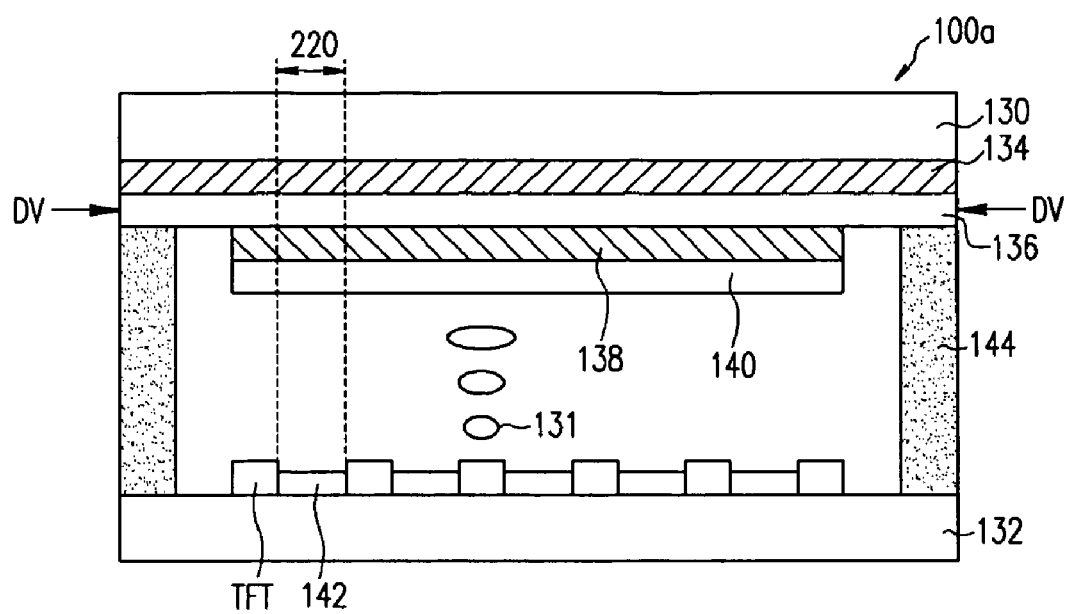
FIG. 3A and FIG. 3B illustrate a structure of a panel according to another embodiment of the present invention.
Figure 3B:
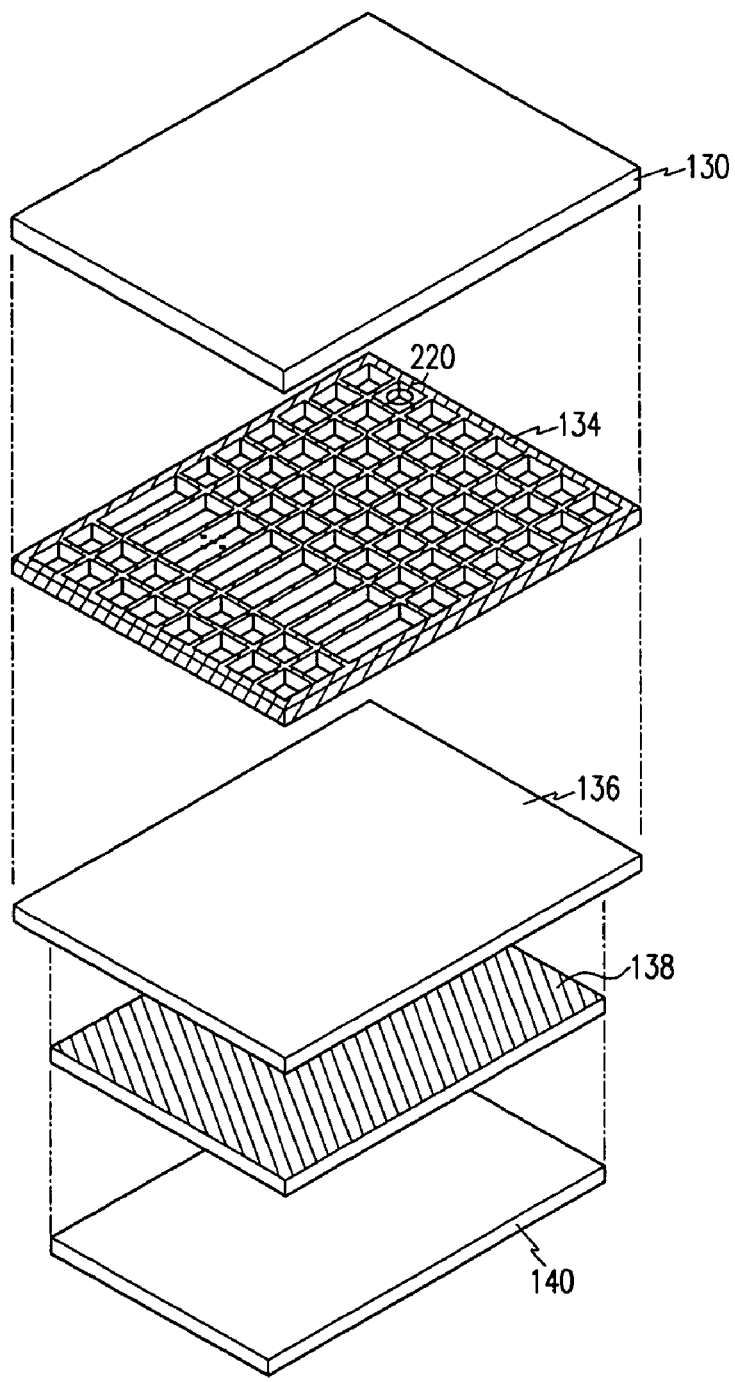

FIG. 3A and FIG. 3B schematically illustrate a structure of a panel 100a according to another embodiment of the present invention. The panel 100a can be used as the panel 100 of FIG. 2, for example.

As shown, the panel 100a includes an upper substrate 130 and a lower substrate 132. The panel 100a also includes a liquid crystal 131 injected between the upper and lower substrates 130 and 132.

On the upper substrate 130, a black matrix 134, a conductive layer 136, an insulation layer 138, a common electrode 140, and a spacer (not shown) are sequentially formed, and thin film transistors (TFTs) and pixel electrodes 142 are formed on the lower substrate 132. The upper substrate 130 and the lower substrate 132 are coupled together by a sealant 144, and the liquid crystal 131 is injected therebetween. The sealant 144 is formed on an edge of the upper substrate 130 and the lower substrate 132, and is coupled to the conductive layer 136.

The black matrix 134 is formed in an area corresponding to areas of the TFT scan lines, and data lines (not shown) of the lower substrate 132. Substantially, the black matrix 134 is formed as a grid (crossing a horizontal direction and a vertical direction) as shown in FIG. 3B, so that a pixel area 220 can be provided therein. The black matrix 134 enhances contrast by preventing leakage of light in adjacent cells and absorbing external light.

The conductive layer 136 is disposed between the black matrix 134 and the insulation layer 138. The conductive layer 136 is formed of a transparent material so that light passing through the lower substrate 132 and the liquid crystal from the external light source can also pass through the conductive layer 136. In various embodiments, the conductive layer 136 may be formed of indium tin oxide (ITO), tin oxide (TO), or indium zinc oxide (IZO). The conductive layer 136 is heated when the DC voltage DV is externally applied thereto, which application increases the temperature of the panel 100a. Hereinafter, the DC voltage externally supplied to heat the conductive layer is referred to as a heating voltage.

The insulation layer 138 is formed between the conductive layer 136 and the common electrode 140, and planarizes a surface of the conductive layer 136 to ensure uniformity of the height of the common electrode 140. The insulation layer 138 is formed as an insulator to insulate the conductive layer 136 from the common electrode 140 to prevent the heating voltage DV from being applied to the common electrode 140.

The common electrode 140 is formed facing the pixel electrodes 142, and the liquid crystal is injected between the common electrode 140 and the pixel electrodes 142. The common electrode 140 externally receives a common voltage Vcom. The common electrode 140 is formed as a transparent electrode (i.e., ITO) so that the light supplied from the lower substrate 132 can be supplied to the upper substrate 130.

The spacer formed on the upper substrate 130 maintains a predetermined distance between the upper substrate 130 and the lower substrate 132.

Each TFT formed on the lower substrate 132 has a gate electrode coupled to the scan line, a source electrode coupled to the data line, and a drain electrode coupled to the pixel electrode 142. Such a TFT applies the data voltage Vd from the data line to the pixel electrode 142 in response to a scan signal transmitted from the data line. A voltage difference (i.e., intensity of electric field) between the data voltage Vd applied to the pixel electrode 142 and the common voltage Vcom applied to the common electrode 140 determines the distortion of the liquid crystal. Light transmittance varies depending on the distortion of the liquid crystal. The pixel electrode 142 is formed as a transparent conductive material having superior light transmittance so that the light supplied from the lower substrate 132 can be supplied to the upper substrate 130.

As described, the temperature of the panel 100a can in one embodiment be maintained at a predetermined temperature (i.e., 10° C.). According to another embodiment of the present invention, the temperature of the panel 100a may be increased by heating the conductive layer 136 when the ambient temperature (i.e. the temperature of the environment surrounding the panel) is sensed to be low. Accordingly, the temperature of the panel 100a can be maintained without regard to the ambient temperature.

In other words, referring back to FIG. 2, when the temperature sensor 800 senses that the temperature of the panel 100 or the ambient temperature is lower than the predetermined temperature (i.e., 10° C.), the control signal is applied to the power supply 700 and the power supply 700 applies the heating voltage DV to the conductive layer 136.

The conductive layer 136 covers the black matrix 134 as shown in FIG. 3B (in other words, the size of the conductive layer 136 corresponds to the upper substrate 130 or is smaller than the upper substrate 130), thereby uniformly transmitting heat generated from the conductive layer 136 throughout the panel 100a.

The area of supply of the heating voltage may vary within the panel 100a in various embodiments of the present invention.

Figure 4:
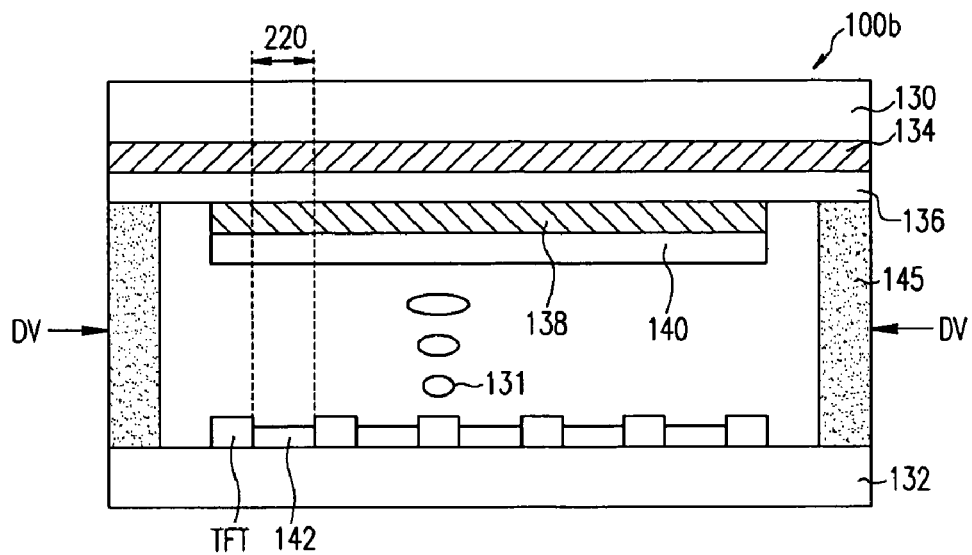
FIG. 4 illustrates a structure of a panel according to yet another embodiment of the present invention.

FIG. 4 illustrates a structure of a panel 100b and a heating voltage supplying area of the panel 100b according to yet another embodiment of the present invention. The panel 100b, for example, can be used as the panel 100 of FIG. 2. Like reference numerals refer to the like elements; accordingly, detailed descriptions related thereto will be omitted.

In the embodiment shown, an upper substrate 130 and a lower substrate 132 are coupled together by a conductive sealant 145, and a liquid crystal 131 is injected between the upper and lower substrates 130 and 132. The sealant 145 is coupled to the conductive layer 136 and is provided with a conductive ball according to this embodiment of the present invention.

As shown in FIG. 4, the heating voltage DV provided by the power supply 700 can be applied to the sealant 145. The sealant 145 may be coupled to the conductive layer 136, and in turn the heating voltage DV applied to the sealant 145 is applied to the conductive layer 136 to generate heat in the conductive layer 136 to maintain the temperature of the panel 100b at the predetermined temperature.

Figure 5:
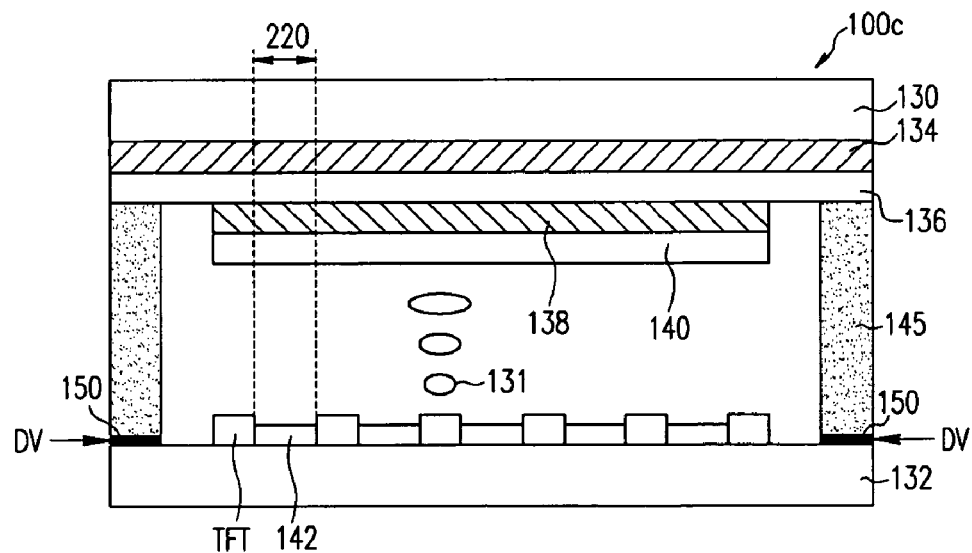
FIG. 5 illustrates a structure of a panel according to yet another embodiment of the present invention.

FIG. 5 illustrates a structure and a heating voltage supplying area of a panel 100c according to yet another embodiment of the present invention. Reference numerals in FIG. 5 which are the same as those in FIG. 4 refer to like elements in FIG.

4, and thus related descriptions will be omitted. The panel 100c of FIG. 5, for example, can be used as the panel 100 of FIG. 2.

As shown in FIG. 5, an auxiliary electrode 150 is formed between a sealant 145 and a lower substrate 132. A heating voltage DV applied to the auxiliary electrode 150 is applied in turn to a conductive layer 136 via the sealant 145.

According to the foregoing embodiment, the heating voltage is applied to the panel to maintain the temperature of the panel above a predetermined temperature when the temperature of the panel is below the predetermined temperature Furthermore, the predetermined temperature can be specified as several separate levels having a distinct heating voltage corresponding to each of the levels which may be applied to the panel.

For example, the predetermined temperature may be specified at two levels, with a high heating voltage being applied to the panel when the panel is at a lower temperature level. This high heating voltage which is applied to the panel when the temperature of the panel is lower has the effect of heating the panel faster than a lower temperature level otherwise would.

Accordingly, the temperature sensor 800 in FIG. 2 transmits different control signals which correspond to predetermined temperature levels to the power supply 700. For example, the temperature sensor 800 transmits a control signal "0000" to the power supply 700 when the temperature of the panel 100, 100a, 100b or 100c or the ambient temperature (i.e., the temperature of the environment surrounding the panel) is higher than the ordinary temperature (i.e., 25° C.), and transmits a plurality of predetermined control signals (i.e., "0001" or "1111") to the power supply 700 when the temperature the panel 100, 100a, 100b or 100c and the ambient temperature are lower than the ordinary temperature. In other words, the power supply 700 supplies corresponding heating voltages to the panel 100, 100a, 100b or 100c in accordance with the predetermined temperature levels corresponding to the control signal transmitted from the temperature sensor 800. The higher heating temperature is applied to the panel when the control signal transmitted to the power supply 700 from the temperature sensor 800 corresponds to the lower temperature level to thereby control the heating speed of the panel 100, 100a, 100b or 100c.

As described, according to the present invention, when the temperature of the panel or the ambient temperature is sensed to be lower than an ordinary temperature, a conductive layer formed between an insulation layer and a black matrix is heated to maintain the temperature of the panel at a higher level than the ordinary temperature to thereby prevent color reproducibility of the panel from being degraded.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, the foregoing embodiment of the present invention is an example of an LCD employing the field sequential method, but it is not restricted thereto.

What is claimed is:

1. A liquid crystal display comprising:
    a panel comprising:
        a first substrate on which a black matrix, a conductive layer, an insulation layer, and a common electrode are formed,
        a second substrate formed opposite to the first substrate and coupled to the first substrate by a conductive sealant, and
        a liquid crystal disposed between the first substrate and the second substrate;
    a temperature sensor for sensing a temperature of the panel and/or an environment surrounding the panel; and
    a power supply for controlling the temperature of the panel by heating the conductive layer in response to the temperature sensed by the temperature sensor;
    wherein the conductive sealant is configured to receive a heating voltage from the power supply and to supply the heating voltage to the conductive layer.

2. The liquid crystal display of claim 1, wherein the conductive layer is formed as a transparent material.

3. The liquid crystal display of claim 2, wherein the conductive layer is formed of indium tin oxide (ITO), tin oxide (TO), or indium zinc oxide (IZO).

4. The liquid crystal display of claim 1, wherein the power supply supplies a heating voltage to the conductive layer when the temperature sensed by the temperature sensor is lower than a reference temperature.

5. The liquid crystal display of claim 1, wherein the power supply is configured to supply a heating voltage to the sealant coupled to the conductive layer when the temperature sensed by the temperature sensor is lower than a reference temperature.

6. The liquid crystal display of claim 1, wherein:
    the liquid crystal display further comprises an auxiliary electrode formed between the conductive sealant and the second substrate, and
    wherein the power supply is configured to supply a heating voltage to the auxiliary electrode when the temperature sensed by the temperature sensor is lower than a reference temperature.

7. The liquid crystal display of claim 4, wherein the reference temperature is between 10° C. and 25° C.

8. The liquid crystal display of claim 1, further comprising:
    a light source for sequentially outputting red, green, and blue lights to each of a plurality of pixels; and
    a light source controller for controlling the light source.

9. The liquid crystal display of claim 1, wherein the temperature sensor produces a plurality of control signals corresponding to a plurality of temperature levels, the plurality of temperature levels being selected from a temperature range below a predetermined temperature.

10. The liquid crystal display of claim 9, wherein the power supply supplies a different heating voltage for each of the temperature levels.

11. The liquid crystal display of claim 10, wherein the power supply supplies a higher heating voltage at a lower temperature level, and a lower heating voltage at a higher temperature level.

12. A method of driving a liquid crystal display comprising a panel having a first substrate on which a black matrix, a conductive layer, an insulation layer, and a common layer are formed, a second substrate formed opposite to the first substrate and assembled with the first substrate using a conductive sealant, and a liquid crystal disposed between the first and second substrates, the driving method comprising:
    sensing a temperature of the panel and/or an environment surrounding the panel; and
    supplying a heating voltage to the conductive sealant coupled to the conductive layer, thereby heating the conductive layer when the temperature of the panel is lower than a reference temperature.

13. The method of driving a liquid crystal display of claim 12, wherein the heating voltage is applied to the conductive layer by being externally applied to an auxiliary electrode formed between the conductive sealant and the second substrate.

14. The method of driving a liquid crystal display of claim 12, wherein the heating of the conductive layer further comprises determining, from among a plurality of temperature levels, a temperature level corresponding to the sensed temperature to produce a determined temperature level, and applying a heating voltage corresponding to the determined temperature level to the conductive layer.

15. The method of driving a liquid crystal display of claim 14, wherein the heating voltage is set to be higher at a lower temperature level, and wherein the heating voltage is set to be lower at a higher temperature level.

* * * * *